US009188191B2

(12) United States Patent
Matsumoto et al.

(10) Patent No.: US 9,188,191 B2
(45) Date of Patent: *Nov. 17, 2015

(54) VIBRATIONPROOF DEVICE (75) Inventors: Yoshinori Matsumoto, Yokohama (JP);
Motohiro Yanagida, Yokohama (JP);
Akira Ueki, Yokohama (JP); Masaaki Ohashi, Yokohama (JP); Yasuyuki Nagashima, Yokohama (JP); Yutaka Higuchi, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 399 days.

This patent is subject to a terminal disclaimer.

(21) Appl. No.: 13/377,449

(22) PCT Filed: Jun. 10, 2010

(86) PCT No.: PCT/JP2010/003885
§ 371 (c)(1),
(2), (4) Date: Feb. 22, 2012

(87) PCT Pub. No.: WO2010/143444
PCT Pub. Date: Dec. 16, 2010

(65) Prior Publication Data
US 2012/0139174 A1 Jun. 7, 2012

(30) Foreign Application Priority Data

Jun. 10, 2009 (JP) .................... 2009-139066
Jun. 10, 2009 (JP) .................... 2009-139068

(51) Int. Cl.
*F16F 13/10* (2006.01)
(52) U.S. Cl.
CPC ..................... *F16F 13/10* (2013.01)
(58) Field of Classification Search
CPC ........................................... F16F 13/10
USPC ........................... 267/140.13, 140.14
See application file for complete search history.

(56) References Cited

U.S. PATENT DOCUMENTS 3,952,075 A * 4/1976 Nakamura et al. ............ 558/186
5,143,358 A 9/1992 Hibi et al.
(Continued)

FOREIGN PATENT DOCUMENTS

CN 1697943 A 11/2005
CN 1701189 A 11/2005
(Continued)

OTHER PUBLICATIONS

Machine translation of JP 2008-298150.*
(Continued)

*Primary Examiner* — Robert A Siconolfi
*Assistant Examiner* — Mahbubur Rashid
(74) *Attorney, Agent, or Firm* — Sughrue Mion, PLLC (57) ABSTRACT A vibrationproof device which is a liquid sealed vibrationproof device includes a tubular first mounting member (3) that is connected to either one of a vibration generating portion and a vibration receiving portion, a second mounting member (4) that is connected to other one, an elastic body (5) that elastically connects the first mounting member (3) and the second mounting member (4), and a partition member (8) that partitions a liquid chamber (7) of the inside of the first mounting member (3) into a main liquid chamber (7A) of an upper side having the elastic body as a portion of a wall surface and an auxiliary liquid chamber (7B) of a lower side, and a restricting passage (80) which communicates with the main liquid chamber (7A) and the auxiliary liquid chamber (7B). In addition, a first liquid (L1) is contained as a main liquid and a second liquid (L2) which is insoluble in the first liquid (L1) is contained as an added liquid in the sealed liquid (L), and the vapor pressure of the second liquid (L2) is higher than the vapor pressure of a main component of the first liquid (L1) in the same temperature and a specific gravity of the second liquid (L2) is lighter than a specific gravity of the first liquid (L1).

7 Claims, 4 Drawing Sheets (56) References Cited

U.S. PATENT DOCUMENTS

| | | | |
|---|---|---|---|
| 6,032,937 A * | 3/2000 | Kojima et al. | 267/140.14 |
| 7,070,175 B2 | 7/2006 | Sakata | |
| 7,216,857 B2 | 5/2007 | Yamamoto | |

FOREIGN PATENT DOCUMENTS

| | | | |
|---|---|---|---|
| JP | 57-9340 A | | 1/1982 |
| JP | 57-163747 A | | 10/1982 |
| JP | 60-205041 A | | 10/1985 |
| JP | 02-085537 A | | 3/1990 |
| JP | 05033824 A | * | 2/1993 |
| JP | 06-221372 A | | 8/1994 |
| JP | 08-061423 A | | 3/1996 |
| JP | 10-252811 A | | 9/1998 |
| JP | 2860701 B2 | | 2/1999 |
| JP | 2001-12537 A | | 1/2001 |
| JP | 2003-148548 A | | 5/2003 |
| JP | 2004-169750 A | | 6/2004 |
| JP | 2004-286068 A | | 10/2004 |
| JP | 2008-298150 A | | 12/2008 |

OTHER PUBLICATIONS

International Search Report, PCT/JP2010/003885, dated Jul. 13, 2010.

Japanese Office Action issued in Japanese Application No. 2009-139066 dated Jun. 4, 2013.

Japanese Office Action issued in Japanese Application No. 2009-139068 dated Jun. 4, 2013.

Communication dated Dec. 17, 2012 from the United States Patent and Trademark Office in counterpart U.S. Appl. No. 12/999,827.

Communication dated Aug. 17, 2012 from the United States Patent and Trademark Office in counterpart U.S. Appl. No. 12/999,827.

Communication dated Apr. 4, 2013 from the United States Patent and Trademark Office in counterpart U.S. Appl. No. 12/999,827.

Communication dated Jul. 11, 2012 from the State Intellectual Property Office of the People's Republic of China in counterpart application No. 200980123126.5.

Communication dated Oct. 29, 2013 from the United States Patent and Trademark Office in counterpart U.S. Appl. No. 12/999,827.

International Search Report dated Sep. 8, 2009 from the International Search Authority in counterpart application No. PCT/JP2009/061012.

Fisher Scientific, "Dow Corporation DC 200 Silicone Fluid Material Safety Data Sheet," Aug. 1993, p. 1.

Silicone Products for Personal Care, KF-6011, KF-6011P, or KF-6043, produced by Shin-Etsu Silicone, May 2011.

Power Chemical, "Silicone Oil", Jan. 2006, p. 3.

* cited by examiner

VIBRATIONPROOF DEVICE

FIELD OF THE INVENTION

The present invention relates to a vibrationproof device which is applied to, for example, vehicles or industrial machinery, and absorbs and damps vibration of a vibration generating portion such as an engine. Priority is claimed on Japanese Patent Application No. 2009-139066, filed Jun. 10, 2009 and Japanese Patent Application No. 2009-139068, filed Jun. 10, 2009, the content of which is incorporated herein by reference.

DESCRIPTION OF RELATED ART

As the above-described vibrationproof devices, hi the related art, for example, as disclosed in Patent Document 1 below, a configuration is known which includes a tubular first mounting member which is connected to either one of a vibration generating portion and a vibration receiving portion, a second mounting member which is connected to the other one of the vibration generating portion and the vibration receiving portion, an elastic body which elastically connects the first mounting member and the second mounting member to each other, and occludes an opening of one side in an axial direction of the first mounting member, a diaphragm which occludes an opening portion of the other side in the axial direction of the first mounting member, a partition member which partitions a liquid chamber formed in the inner portion of the first mounting member into a main liquid chamber having a portion of the partition wall as the elastic body and an auxiliary liquid chamber having a portion of the partition wall as the diaphragm. A restricting passage which communicates with the main liquid chamber and the auxiliary liquid chamber is formed in the above-described partition member, and a sealed liquid in the liquid chamber can come and go between the main liquid chamber and the auxiliary chamber through the restricting passage.

As the above-described liquid sealed vibrationproof device, for example, as disclosed in Patent Document 1 below, there is an upright type vibrationproof device in which the elastic body is arranged above the partition member, the main liquid chamber is formed above the partition member, and the auxiliary liquid chamber is formed below the partition member.

As vibrationproof devices other than the above-described one, for example, as disclosed in Patent Document 2 below, there is a suspension type vibrationproof device in which the elastic body is arranged below the partition member, the main liquid chamber is formed below the partition member, and the auxiliary liquid chamber is formed above the partition member.

Meanwhile, in the liquid sealed vibrationproof device, for example, if internal volume of the main liquid chamber is suddenly increased due to rebounding of the elastic body after large vibrations (load) are input due to roughness of a road surface or the like and the internal volume of the main liquid chamber is suddenly decreased, a sudden pressure decrease is locally generated in the vicinity of an opening portion of the main liquid chamber side of the restricting passage. As a result, there is a problem in that many bubbles are generated in the liquid in the main liquid chamber or the restricting passage and cavitation occurs. The bubbles generated by the cavitation disappear according to the fact that the internal volume of the main liquid chamber is again decreased and the liquid pressure in the main liquid chamber is increased. However, shock waves are generated when the bubbles disappear, the shock waves propagate metal materials such as the first mounting member, and noise occurs.

Therefore, in the related art, as vibrationproof devices for suppressing occurrence of the cavitation, for example, as disclosed in Patent Document 2 below, a liquid pressure valve type vibrationproof device is suggested in which a valve opened and closed according to a liquid pressure fluctuation is provided in a partition member. The valve is a valve element which opens and closes a communication hole which communicates with the main liquid chamber and the auxiliary liquid chamber, and is opened when the liquid pressure of the main liquid chamber is decreased. According to the liquid pressure valve type vibrationproof device, since the valve (valve element) is opened when the liquid pressure of the main liquid chamber is decreased and the main liquid chamber communicates with the auxiliary liquid chamber through the communication hole, decrease of the liquid pressure in the main liquid chamber can be suppressed. As a result, thereby, occurrence of the cavitation is suppressed.

Moreover, as liquid sealed vibrationproof devices of the related art, for example, as disclosed in Patent Document 3 below, two-liquid mixture type vibrationproof device is suggested in which a plurality of liquids are sealed in the liquid chamber. More specifically, the vibrationproof device is an upright type vibrationproof device in which an elastic body is arranged above a partition member, a diaphragm is arranged below the partition member, a main liquid chamber is formed above the partition member, and an auxiliary liquid chamber is formed below the partition member, wherein a first liquid consisting of mainly ethylene glycol and a second liquid consisting of silicone oil are sealed in the liquid chambers respectively. In the liquid sealed vibrationproof device, the spring constant is changed according to characteristics of the liquids which circulate in the restricting passage. Thereby, according to the above-described vibrationproof device in which the plurality of liquids are sealed, the first liquid circulates in the restricting passage and the vibration is damped when a small amplitude vibration such as an idling vibration is input. In addition, when a large amplitude vibration is input, the second liquid circulates in the restricting passage, and the vibration damping performance is developed at a frequency range which is different from the case where the first liquid circulates.

CITATION LIST

Patent Document

[Patent Document 1] Japanese Unexamined Patent Application, First Publication No. 8-61423.
[Patent Document 2] Japanese Unexamined Patent Application, First Publication No. 2004-169750.
[Patent Document 3] Japanese Patent Publication No. 2860701.

SUMMARY OF THE INVENTION

Problem to be Solved by the Invention

However, in the above-described liquid pressure valve type vibrationproof device, in some cases, since the valve is opened and closed even when the small amplitude vibration is input, there is a problem in that the vibrationproof performance of the vibrationproof device itself is decreased. In addition, there is a problem in that the valve abuts the partition wall and noise is generated when the valve is opened and closed, or a configuration of the partition wall is complicated or increased in size due to the valves.

On the other hand, the above-described upright two-liquid mixture type vibrationproof device of the related art includes the configuration in which the specific gravity of the second liquid is lighter than the specific gravity of the first liquid and the second liquid is collected in the main liquid chamber side. However, since cavitation of the second liquid is not excited if the vapor pressure of the second liquid is not higher than the vapor pressure of the first liquid, the effect which decreases the cavitation collapse cannot be obtained. Moreover, in order to obtain the effect which change the resonance as described in Patent Document 3 when a liquid having a higher vapor pressure is used as the second liquid, the second liquid having a sufficient amount of a degree which fills the main liquid chamber (auxiliary liquid chamber when the specific gravity of the second liquid is heavier than that of the first liquid) and an orifice is required. However, the second liquid is easily boiled, and a small amount thereof is vaporized even at room temperature. Thereby, if the amount of the second liquid is too increased, bubbles always remain in the liquid chamber, and sufficient resonance cannot be obtained. Therefore, in the technology described in Patent Document 3, a sealed liquid is not supposed in which a small amount of the second liquid having a high vapor pressure is added to the first liquid.

In contrast, if a content of the second liquid is small and the second liquid is dispersed in the first liquid, cavitation is preferentially generated in the second liquid which has a high vapor pressure. Thereby, a local pressure decrease is suppressed in the vicinity of an opening portion of the main liquid chamber side of the restricting passage, and occurrence of the cavitation in the first liquid is suppressed in the vicinity of the opening portion. As a result, noise in the entire vibrationproof device is suppressed. However, in the above-described suspension type vibrationproof device, if the specific gravity of the second liquid is lighter than that of the first liquid, for example, when a state where vibrations are not input is continued during some period of time and the first liquid and the second liquid which are insoluble to each other are separated, the second liquid is raised and collected in the auxiliary liquid chamber. Even when a large vibration is input in this state, in some cases, the second liquid does not reach the vicinity of the opening portion of the main liquid chamber side where liquid pressure is locally decreased. Thereby, there is a concern that cavitation may be not preferentially generated in the second liquid in the vicinity of the opening portion and the cavitation may be generated in the first liquid in the vicinity of the opening portion of the main liquid chamber side. As a result, there is a problem in that decrease effect to noise is not stabilized.

The present invention is made in consideration of problems in the related art, and an object thereof is to provide a vibrationproof device capable of suppressing occurrence of cavitation without decreasing the vibrationproof performance or complicating and increasing the size of the configuration of the vibrationproof device. In addition, another object of the present invention is to provide a vibrationproof device capable of immediately suppressing the cavitation and decreasing noise even when a large vibration is input in a state where a second liquid is separated from a first liquid.

Means for Solving the Problem

A vibrationproof device related to a first embodiment of the present invention is a liquid sealed vibrationproof device which includes a tubular first mounting member that is connected to either one of a vibration generating portion and a vibration receiving portion, a second mounting member that is connected to other one thereof, an elastic body that elastically connects the first mounting member and the second mounting member to each other, and a partition member that partitions a liquid chamber of the inside of the first mounting member into a main liquid chamber of an upper side having the elastic body as a portion of a wall surface and an auxiliary liquid chamber of a lower side, wherein a restricting passage is formed which communicates with the main liquid chamber and the auxiliary liquid chamber and in which a liquid column resonance is generated due to the fact that a liquid in the liquid chamber is circulated, and a sealed liquid is sealed in the liquid chamber. Moreover, a first liquid is contained as a main liquid and a second liquid which is insoluble in the first liquid is contained as an added liquid in the sealed liquid. In addition, the vapor pressure of the second liquid is higher than the vapor pressure of a main component of the first liquid in the same temperature and a specific gravity of the second liquid is lighter than a specific gravity of the first liquid.

The vibrationproof device related to the first embodiment of the present invention is a so-called upright type vibrationproof device. When a state where a vibration is not input in the vibrationproof device is continued and the first liquid and the second liquid which are insoluble to each other are separated in the liquid chamber, the second liquid, in which the specific gravity is lighter than that of the first liquid, is raised, and the second liquid is collected in the main liquid chamber of the upper side. Moreover, in this state, if a large vibration is input, for example, due to the fact that the first liquid or the second liquid passes through the restricting passage, the internal volume of the main liquid chamber is changed, cavitation is generated in the main liquid chamber, or the like, the second liquid as innumerable granules is dispersed in the first liquid independent of one another. Moreover, when the internal volume of the main liquid chamber is suddenly increased and the liquid pressure of the main liquid chamber is decreased, the cavitation is preferentially generated in the second liquid which has a higher vapor pressure than the main component of the first liquid in the vicinity of the opening portion of the restricting passage in which the flow rate is particularly increased in the main liquid chamber. As a result, a local decrease in the liquid pressure in the vicinity of the opening portion is suppressed, and the occurrence of the cavitation in the first liquid in the vicinity of the opening portion is suppressed. In addition, even when cavitation is generated in the first liquid, since bubbles generated due to the cavitation are suppressed so as to be smaller, shock waves due to the collapse of the cavitation in the first liquid are suppressed so as to be smaller.

Moreover, at this time, since the second liquid is collected at the main liquid chamber in which the cavitation is generated as described above, even when a large vibration is input in the state where the second liquid is separated from the first liquid, the second liquid is immediately dispersed in the first liquid in the main liquid chamber, and cavitation in the first liquid in the vicinity of the opening portion is suppressed as described above.

On the other hand, since the second liquid is dispersed in the first liquid, increase in the growth of bubbles generated in the second liquid is suppressed. Therefore, an increase in a shrinkage rate of the bubbles during condensation is suppressed, and the shock waves due to the cavitation collapse in the second liquid are suppressed so as to be smaller.

Moreover, since innumerable shock waves generated from the individual granular second liquid dispersed in the first liquid interfere with one another and the energies are cancelled out, the shock waves due to the cavitation collapse in the second liquid are suppressed so as to be smaller.

In addition, thereafter, if vibrations (loads) are further repeatedly input, the second liquid is dispersed more finely and evenly over the entire region in the first liquid. Therefore, cavitation of the first liquid in the vicinity of the opening portion is further suppressed.

Moreover, in the vibrationproof device related to the present invention, it is preferable that a liquid collecting concave portion which is arranged in the vicinity of the main liquid chamber side opening of the restricting passage and in which the second liquid is collected be formed in the elastic body. Thereby, when the first liquid and the second liquid are separated from each other, the second liquid which flows into the main liquid chamber of the upper side is collected inside the liquid collecting concave portion.

At this time, since the liquid collecting concave portion is formed in the vicinity of the main liquid chamber side opening, the second liquid which flows from the opening of the main liquid chamber side into the main liquid chamber is easily collected inside the liquid collecting concave portion. In addition, the above-described cavitation is most easily generated in the periphery of the main liquid chamber side opening. However, the second liquid separated from the first liquid is collected in the vicinity of the main liquid chamber side opening of the restricting passage. Thereby, when a large vibration is input in the state where the first liquid and the second liquid are separated from each other, the internal volume of the main liquid chamber is suddenly shrunk, and the liquid pressure is increased, the second liquid easily flows from the main liquid chamber side opening into the restricting passage, and the second liquid is easily dispersed in the peripheral portion of the main liquid chamber side opening. Therefore, the above-described effect which suppresses the cavitation by the second liquid is efficiently performed.

Moreover, "the vicinity" of the present invention refers to a position which is overlapped in at least a portion in the main liquid chamber side opening in plan view, or a position which approaches a degree exhibiting the same effect even being slightly separated.

Moreover, in the vibrationproof device related to the present invention, it is preferable that the liquid collecting concave portion be arranged in a front side in the circulation direction of the sealed liquid from the restricting passage to the main liquid chamber through the main liquid chamber side opening.

According to the configuration, since the second liquid which flows from the main liquid chamber side opening into the main liquid chamber flows inside the liquid collecting concave portion in the flow, the second liquid is easily collected inside the liquid collecting concave portion. Moreover, when a large vibration is input and the liquid pressure of the main liquid chamber is increased in the state where the second liquid separated from the first liquid is accumulated inside the liquid collecting portion, the second liquid in the liquid collecting portion easily flows from the main liquid chamber side opening into the restricting passage.

In addition, in the vibrationproof device related to the present invention, it is preferable that the surface tension of the second liquid be smaller than the surface tension of the first liquid.

According to the configuration, the second liquid is dispersed easily and in a wide range in the first liquid. Moreover, the second liquid becomes finely granular while having a smaller grain diameter in the first liquid and is dispersed in the first liquid independently of one another.

A vibrationproof device related to a second embodiment of the present invention is a liquid sealed vibrationproof device which includes a tubular first mounting member that is connected to either one of a vibration generating portion and a vibration receiving portion, a second mounting member that is connected to other one thereof, an elastic body that elastically connects the first mounting member and the second mounting member to each other, and a partition member that partitions a liquid chamber of the inside of the first mounting member into a main liquid chamber of a lower side having the elastic body as a portion of a wall surface and an auxiliary liquid chamber of an upper side, wherein a restricting passage is formed which communicates with the main liquid chamber and the auxiliary liquid chamber and in which a liquid column resonance is generated due to the fact that a liquid in the liquid chamber is circulated, and a sealed liquid is sealed in the liquid chamber. Moreover, a first liquid is contained as a main liquid and a second liquid which is insoluble in the first liquid is contained as an added liquid in the sealed liquid. In addition, the vapor pressure of the second liquid is higher than the vapor pressure of a main component of the first liquid in the same temperature and a specific gravity of the second liquid is heavier than a specific gravity of the first liquid.

The vibrationproof device related to the second embodiment of the present invention is a so-called suspension type vibrationproof device. When a state where a vibration is not input in the vibrationproof device is continued and the first liquid and the second liquid which are insoluble to each other are separated in the liquid chamber, the second liquid, in which the specific gravity is heavier than that of the first liquid, is lowered, and the second liquid is collected in the main liquid chamber of the lower side. Moreover, in this state, if a large vibration is input, for example, due to the fact that the first liquid or the second liquid passes through the restricting passage, the internal volume of the main liquid chamber is changed, cavitation is generated in the main liquid chamber, or the like, the second liquid as innumerable granules is dispersed in an independent state to one another in the first liquid. Moreover, when the internal volume of the main liquid chamber is suddenly increased and the liquid pressure of the main liquid chamber is decreased, the cavitation is preferentially generated in the second liquid which has higher vapor pressure than the main component of the first liquid in the vicinity of the opening portion of the restricting passage in which the flow rate particularly is increased in the main liquid chamber. As a result, a local decrease in the liquid pressure in the vicinity of the opening portion is suppressed, and occurrence of the cavitation in the first liquid in the vicinity of the opening portion is suppressed. In addition, even when cavitation is generated in the first liquid, since bubbles generated due to the cavitation are suppressed so as to be smaller, shock waves due to the cavitation collapse are suppressed so as to be smaller.

Moreover, at this time, since the second liquid is collected at the main liquid chamber in which the cavitation is generated as described above, even when a large vibration is input in the state where the second liquid is separated from the first liquid, the second liquid is immediately dispersed in the first liquid in the main liquid chamber, and cavitation in the first liquid in the vicinity of the opening portion is suppressed as described above.

On the other hand, since the second liquid is dispersed in the first liquid, increase in the growth of bubbles generated in the second liquid is suppressed. Therefore, an increase in the shrinkage rate of the bubbles during condensation is suppressed, and the shock waves due to the cavitation collapse in the second liquid are suppressed so as to be smaller.

Moreover, since innumerable shock waves generated from individual granular second liquid dispersed in the first liquid interfere with one another and the energies are cancelled out, the shock waves due to the cavitation collapse in the second liquid are suppressed so as to be smaller.

In addition, thereafter, if vibrations (loads) are further repeatedly input, the second liquid is dispersed more finely and evenly over the entire region in the first liquid. Therefore, cavitation of the first liquid in the vicinity of the opening portion is further suppressed.

Moreover, in the vibrationproof device related to the present invention, it is preferable that a liquid collecting concave portion which is arranged in the vicinity of the main liquid chamber side opening of the restricting passage and in which the second liquid is collected be formed in the elastic body.

According to the configuration, when the first liquid and the second liquid are separated from each other, the second liquid which flows into the main liquid chamber of the lower side is collected inside the liquid collecting concave portion. At this time, since the liquid collecting concave portion is formed in the vicinity of the main liquid chamber side opening, the second liquid which flows from the opening of the main liquid chamber side into the main liquid chamber is easily collected inside the liquid collecting concave portion. In addition, the above-described cavitation is most easily generated in the periphery of the main liquid chamber side opening. However, the second liquid separated from the first liquid is collected in the vicinity of the main liquid chamber side opening of the restricting passage. Thereby, when a large vibration is input in the state where the first liquid and the second liquid are separated from each other, the internal volume of the main liquid chamber is suddenly shrunk, and the liquid pressure is increased, the second liquid easily flows from the main liquid chamber side opening into the restricting passage, and the second liquid is easily dispersed in the peripheral portion of the main liquid chamber side opening. Therefore, the above-described effect which suppresses the cavitation by the second liquid is efficiently performed.

Moreover, "the vicinity" of the present invention refers to a position which is overlapped in at least a portion in the main liquid chamber side opening in plan view, or a position which approaches a degree exhibiting the same effect even being slightly separated.

Moreover, in the vibrationproof device related to the present invention, it is preferable that the liquid collecting concave portion be arranged in a front side in the circulation direction of the sealed liquid from the restricting passage to the main liquid chamber through the main liquid chamber side opening.

According to the configuration, since the second liquid which flows from the main liquid chamber side opening into the main liquid chamber flows inside the liquid collecting concave portion in the flow, the second liquid is easily collected inside the liquid collecting concave portion. Moreover, when a large vibration is input and the liquid pressure of the main liquid chamber is increased in the state where the second liquid separated from the first liquid is collected inside the liquid collecting portion, the second liquid in the liquid collecting portion easily flows from the main liquid chamber side opening into the restricting passage.

In addition, in the vibrationproof device related to the present invention, it is preferable that the surface tension of the second liquid be smaller than the surface tension of the first liquid.

According to the configuration, the second liquid is dispersed easily and in a wide range in the first liquid. Moreover, the second liquid becomes finely granular with a smaller grain diameter in the first liquid and is dispersed in the first liquid independently of one another.

Effects of the Invention

According to the vibrationproof device related to the present invention, occurrence of the cavitation can be suppressed without decreasing the vibrationproof performance or complicating and increasing the size of the configuration. According to the vibrationproof device related to the present invention, the cavitation is immediately suppressed and noise can be decreased even when a large vibration is input in a state where the second liquid is separated from the first liquid.

PREFERRED EMBODIMENTS

Hereinafter, embodiments of a vibrationproof device related to the present invention will be explained with reference to the drawings.

Figure 1:
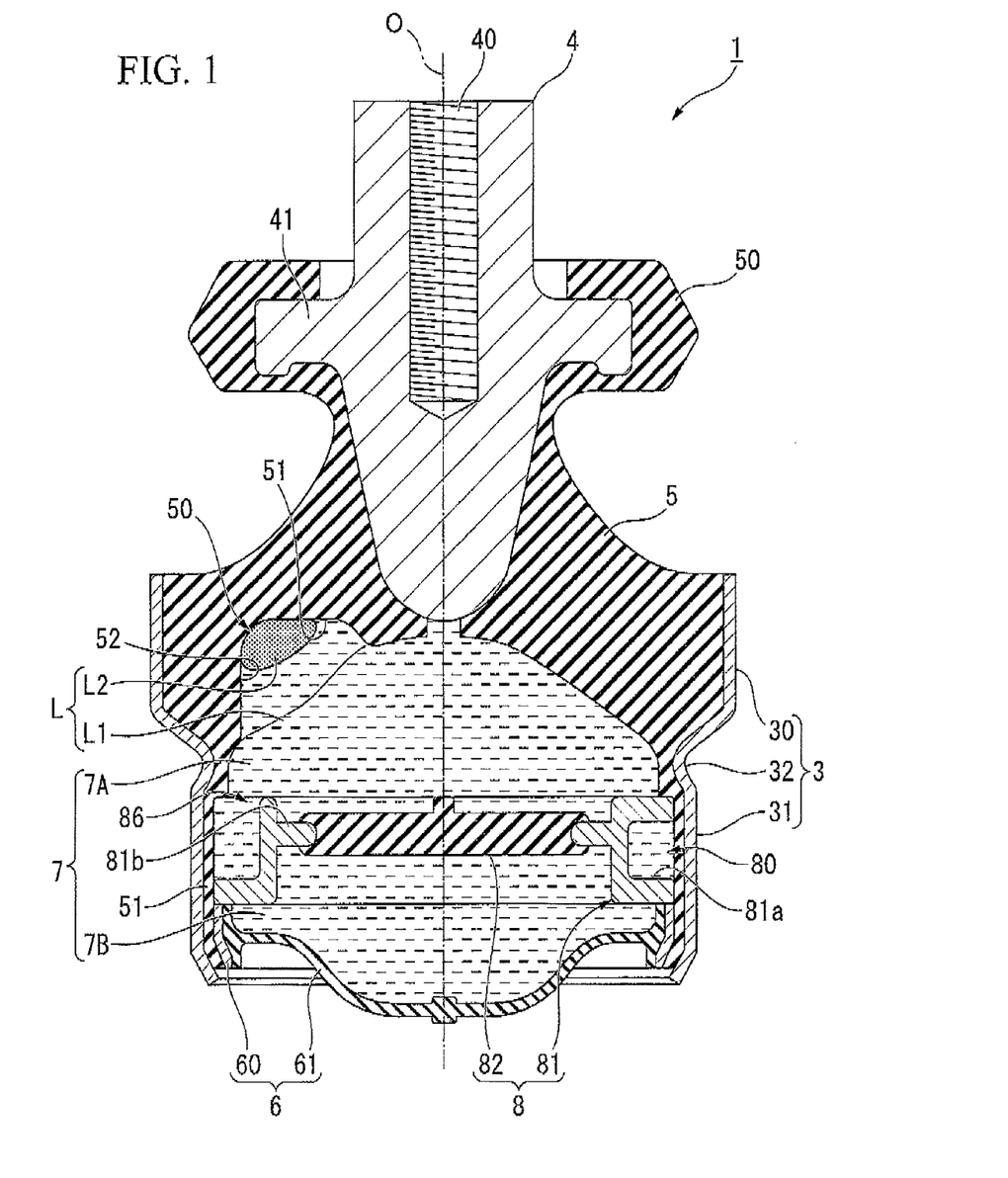
FIG. 1 is a longitudinal cross-sectional view of a vibrationproof device in a first embodiment of the present invention.

Moreover, in the present embodiment, a reference numeral O denoted in FIG. 1 indicates a central axis of an outer cylinder 3 (corresponding to a first mounting member in the present invention), and hereinafter is simply denoted as an "axis O". In addition, a direction along the axis O is referred to as an "axial direction", a direction perpendicular to the axis O is referred to as a "radial direction", and a direction around the axis O is referred to as a "circumferential direction". Moreover, the lower side in the axial direction in FIG. 1 is a bound side, that is, a direction to which a static load (initial load) is input when a vibrationproof device 1 is installed. On the other hand, the upper side in the axial direction in FIG. 1 is a rebound side, that is, a side which is opposite to the input direction of the static load. In the explanation hereinafter, the bound side is referred to a "lower side", and the rebound side is referred to as an "upper side".

The vibrationproof device 1 related to a first embodiment of the present invention is a device for damping a vibration of a vibration generation portion used when an engine which is an example of the vibration generating portion is mounted on a vehicle body which is an example of a vibration receiving portion. As shown in FIG. 1, the vibrationproof device 1 includes an approximately outer cylinder 3 which is connected to the vehicle body (not shown) through a vehicle body bracket (not shown); an inner cylinder 4 (corresponding to a second mounting member in the present invention) which is connected to an engine (not shown) through an engine bracket (not shown); an elastic body 5 which is elastically connected to the outer cylinder 3 and the inner cylinder 4 and occludes an opening end of the upper side of the outer cylinder 3; a diaphragm 6 which occludes an opening end of the lower side of the outer cylinder 3; and a partition wall 8 which partitions a liquid chamber 7 formed inside the outer cylinder 3 into a main liquid chamber 7A of the upper side and an auxiliary liquid chamber 7B of the lower side. Moreover, the outer cylinder 3, the inner cylinder 4, and the elastic body 5 are integrally formed, and a vibrationproof device main body 2 is configured by the outer cylinder 3, the inner cylinder 4, and the elastic body 5. In addition, the vibrationproof device 1 of the present embodiment is an upright vibrationproof device in which the main liquid chamber 7A is formed above the auxiliary liquid chamber 7B while interposing the partition member 8, the diaphragm 6 is arranged below the partition member 8, and the inner cylinder 4 is protruded toward the upper portion of the elastic body 5, and a compression type vibrationproof device in which a compressive force operates the elastic body 5 due to the fact that an initial load is input.

An approximately cylindrical upper tubular portion 30 is formed at the upper side of the outer cylinder 3, an approximately cylindrical lower tubular portion 31 which has a smaller diameter than the upper tubular portion 30 is formed at the lower side of the outer cylinder. The upper tubular portion 30 and the lower tubular portion 31 are an approximately cylindrical metallic member in which each of both ends is opened. A throttle portion 32 in which the diameter is decreased to the inner circumference side is formed over the entire circumference between the upper tubular portion 30 and the lower tubular portion 31.

The inner cylinder 4 is a columnar member which is extended in the axial direction, and the lower portion of the inner cylinder 4 has a taper shape in which the diameter is gradually decreased in the downward direction. Moreover, a screw hole 40 is drilled so as to be extended in the axial direction from the center of the upper end surface of the inner cylinder 4 in the upper portion of the inner cylinder 4. An anchor 41 is formed so as to be protruded outside the radial direction in an intermediate portion in the axial direction of the inner cylinder 4.

The elastic body 5 is a rubber which occludes an opening portion of the upper side of the outer cylinder 3 and has an approximately truncated cone shape in which the diameters of the upper surface and the lower surface are gradually decreased in the upward direction. The elastic body 5 is vulcanized and adhered to the inner circumference surfaces of the upper tubular portion 31 and the throttle portion 32 of the outer cylinder 3, and the inner circumference surface of the elastic body 5 is vulcanized and adhered to the outer circumference surface of the lower portion of the inner cylinder 4. A rubber buffer 50 which covers the anchor 41 of the inner cylinder 4 is integrally formed on the upper end of the elastic body 5. Moreover, a rebound stopper which regulates the rebound in which the inner cylinder 4 is relatively raised with respect to the outer cylinder 3 is formed by the buffer 50 and the anchor 41. In addition, a rubber coating body 51 which covers the inner circumference surface of the lower tubular portion 30 of the outer cylinder 3 is integrally formed on the lower end of the elastic body 5. The cover film 51 covers the entire circumference of the inner circumference surface of the outer cylinder 3. In addition, the above-described elastic body 5, the buffer 50, and the covering body 51 may be an elastic body which is formed of a synthetic resin or the like other than rubber.

Figure 2:
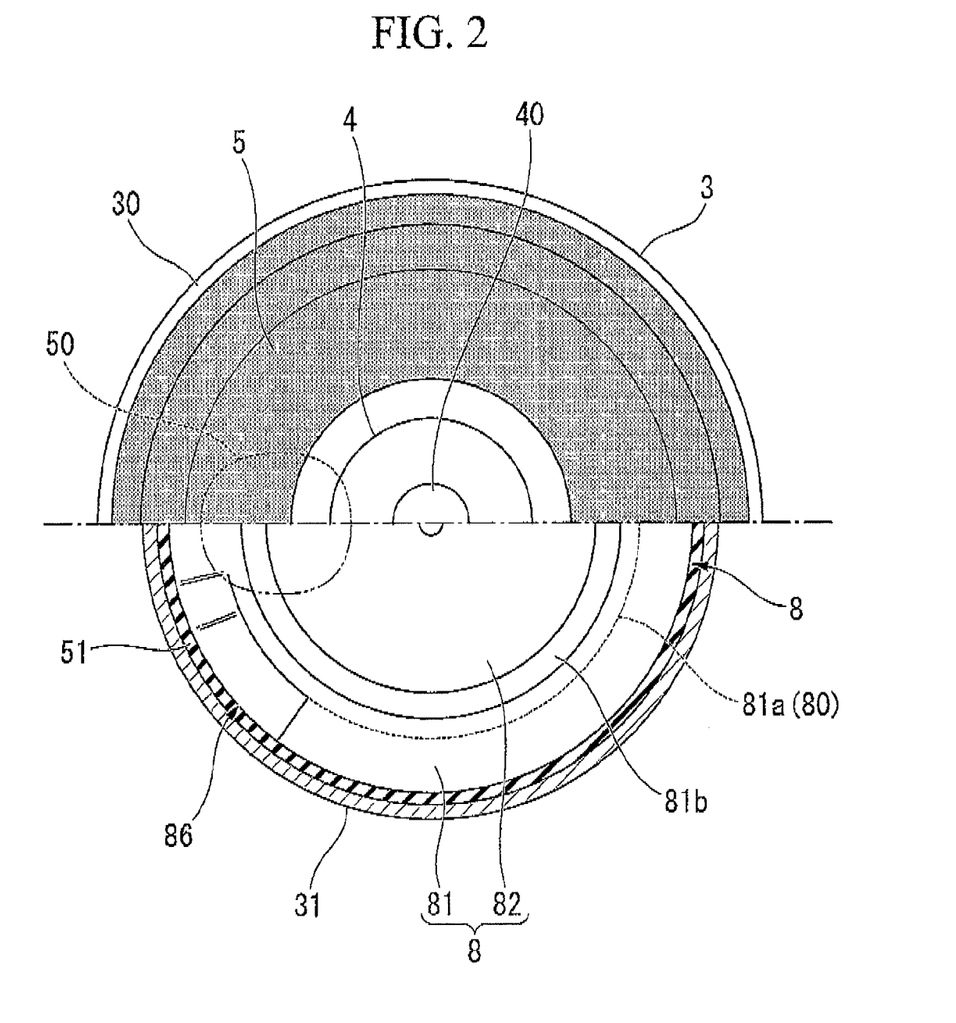
FIG. 2 is a traverse half cross-sectional view of the vibrationproof device in the first embodiment of the present invention.

Moreover, a liquid collecting concave portion 50 which can accommodate a liquid and communicates with the main liquid chamber 7A is provided in the elastic body 5. The liquid collecting concave portion 50 is a concave portion for collecting a second liquid L2 described hereinafter, and arranged in the vicinity of a main liquid chamber side opening 86 described hereinafter as shown in FIG. 2.

In more detail, the liquid collecting concave portion 50 is positioned at the outer circumferential portion of the elastic body 5, that is, a position which is dethroughted from the axis O in plan view. Specifically, the liquid collecting concave portion 50 is formed in the lowest portion in the tapered lower surface of the elastic body 5. Moreover, the liquid collecting portion 50 is arranged in the front side in a circulation direction of a sealed liquid L which flows from an orifice 80 described hereinafter into the main liquid chamber 7A through the main liquid chamber side opening 86. That is, the liquid collecting concave portion 50 is disposed so as to be adjacent to one side in the circumferential direction of the main liquid chamber side opening 86 which is formed in the end of one side in the circumferential direction of the orifice 80 in plan view. Moreover, in plan view, the liquid collecting concave portion 50 and the main liquid chamber side opening 86 may not be disposed so as be continuous and be disposed in a state of slightly being separated from each other or a state of slightly being overlapped each other. In addition, the liquid collecting concave portion 50 includes a top wall 51 which is formed along a surface perpendicular to the axis O, and a peripheral wall portion 52 which is erected from the outer edge of the top wall 51 and in which the lower end is connected to the tapered lower surface of the elastic body 5.

The diaphragm 6 is a film body which occludes an opening portion of the lower side of the outer cylinder 3 and is deformed according to a liquid pressure fluctuation of the auxiliary liquid chamber 7B. In addition, the diaphragm 6 is a reverse bowl shape which is formed as a circular shape in top view and bulged toward the lower side. In more detail, the diaphragm 6 includes a circular diaphragm ring 60 and a membranous diaphragm rubber 61 which is extended inside the diaphragm ring 60. An outer peripheral edge portion of the diaphragm rubber 61 is vulcanized and adhered to inner circumference surface of the diaphragm ring 60 over the entire circumference. In addition, the diaphragm ring 60 is fitted into the opening portion of the lower side of the outer cylinder 3 and caulked so as to be fixed, and therefore, the diaphragm 6 occludes the outer cylinder 3 from the lower side.

The inner portion of the outer cylinder 3 positioned between the above-described diaphragm 6 and the elastic body 5 is the liquid chamber 7 which is liquid-tightly occluded by the diaphragm 6 and the elastic body 5 and in which the sealed liquid L is filled. In addition, the liquid chamber 7 has the elastic body 5 as a portion of a partition wall by the partition member 8. Moreover, the liquid chamber 7 is partitioned into the main liquid chamber 7A in which the internal volume is changed by deformation of the elastic body 5, and the auxiliary liquid chamber 7B which has the diaphragm 6 as a portion of the partition wall and in which the internal volume is changed by deformation of the diaphragm 6.

The partition member 8 is a member which is fitted inside the lower tubular portion 31 of the outer cylinder 3 and is to partition the liquid chamber 7 up and down. The partition member 8 includes a circular partition member main body 81 and is a membrane 82 which is extended inside the circular partition member main body 81.

The partition member main body 81 is a resin-made member, and a circumferential groove 81a constituting the orifice 80 is formed in the outer circumferential surface of the partition member main body 81. Moreover, a flange portion 81b which is protruded to the inside in the radial direction is formed over the entire circumference in the inner circumference surface of the partition member main body 81. The circumferential groove 81a is occluded from the outside in the radial direction of the partition member 8 by the cover film 51 which is covered on the inner circumference surface of the outer cylinder 3. According to the configuration, the orifice 80 which communicates with the main liquid chamber 7A and the auxiliary liquid chamber 7B is formed. In addition, the main liquid chamber side opening 86 which communicates with the orifice 80 and the main liquid chamber 7A is formed on the upper surface (upper wall portion of circumferential groove 81a) of the partition member main body 81a. In addition, an auxiliary liquid chamber side opening (not shown) which communicates the orifice 80 and the auxiliary liquid chamber 7B is formed on the lower surface (lower wall portion of circumferential groove 81a) of the partition main body 81a.

The membrane 82 is a disk-shaped rubber member, and the outer edge of the membrane is vulcanized and adhered to the flange portion 81b of the annular partition member main body 81. Moreover, the inside of the annular partition member main body 81b is occluded by the membrane 82.

Incidentally, the sealed liquid L in which a first liquid L1 is contained as a main liquid and a second liquid L2 is contained as an added liquid is filled in the liquid chamber 7 which is enclosed by the outer cylinder 3, the elastic body 5, and the diaphragm 6 which are described above. Moreover, the first liquid L1 and the second liquid L2 have incompatibility, that is, are liquids which are insoluble to each other. In more detail, amount of the second liquid L2 which is an added liquid is less than the amount of the first liquid L1 which is a main liquid, and the weight ratio of the second liquid L2 included in the sealed liquid L is smaller than the weight ratio of the first liquid L1. In addition, in the same temperature (temperature range which is at least −30° C. or more and 100° C. or less), the vapor pressure of the second liquid L2 is higher than that of the main component of the first liquid L1, for example, the vapor pressure of the second liquid L2 is two or more times the vapor pressure of the main component of the first liquid L1. Moreover, a specific gravity of the second liquid L2 is lighter than a specific gravity of the first liquid L1, and the second liquid L2 in the first liquid L1 is raised (broach). Moreover, the surface tension of the second liquid L2 is smaller than that of the first liquid L1.

As the above-described first liquid L1, for example, substances containing ethylene glycol and propylene glycol, ethylene glycol simple substance, or propylene glycol simple substance, and the like are exemplified. Moreover, as the second liquid L2, for example, silicone oil and the like are exemplified. In addition, the sealed liquid L contains the first liquid L1 of 60 weight % or more and 99.9 weight % or less and the second liquid L2 of 0.1 weight % or more and 40 weight % or less. Preferably, the sealed liquid L contains the first liquid L1 of 80 weight % or more and 99 weight % or less and the second liquid L2 of 0.5 weight % or more and 20 weight % or less. For example, when the first liquid L1 is 100 g in the sealed liquid L, the second liquid L2 of 0.5 g to 20 g is contained.

Next, operation of the vibrationproof device 1 related to the first embodiment of the present invention will be explained.

For example, when the inner cylinder 4 and the outer cylinder 3 are greatly relatively displaced in the axial direction due to roughness of a road surface during driving or the like, if a great vibration is input to the vibrationproof device 1, the first liquid L1 or the second liquid L2 pass through the orifice 80, the internal volume of the main liquid chamber 7A is changed, or cavitation is generated in the main liquid chamber 7A. As a result, a second liquid L2 is dispersed as innumerable granules in the first liquid L1 independent of one another. In addition, when the internal volume of the main liquid chamber 7A is suddenly increased and the liquid pressure of the main liquid chamber 7A is decreased, cavitation is preferentially generated in the second liquid L2 having higher vapor pressure than the main component of the first liquid L1 in the vicinity of the main liquid chamber side opening 86 of the orifice 80 in which a flow rate is particularly increased in the main liquid chamber 7A. Thereby, a local liquid pressure decrease is suppressed in the vicinity of the main liquid chamber side opening 86, and a phenomenon in which cavitation is generated in the first liquid L1 in the vicinity of the main liquid chamber side opening 86 is suppressed. Moreover, even when cavitation is generated in the first liquid L1, bubbles generated due to the cavitation are suppressed so as to be smaller. Thereby, shock waves due to the cavitation collapse in the first liquid L1 are suppressed so as to be smaller.

Moreover, the second liquid L2 becomes granular having a small grain diameter and is dispersed in the first liquid L1. Thereby, a phenomenon is suppressed in which bubbles generated in the second liquid L2 grow to be large. Therefore, a phenomenon is suppressed in which a shrinkage rate of the bubbles during condensation is increased, and the shock waves due to the cavitation collapse in the second liquid L2 are suppressed to be smaller. Moreover, since innumerable shock waves generated from individual second liquid L2 interfere with one another and the energies are cancelled out. Thereby, the shock waves due to the cavitation collapse in the second liquid L2 are suppressed so as to be smaller.

On the other hand, if time intervals elapse after an engine is stopped, since the specific gravity of the second liquid L2 is lighter than that of the first liquid L1, the second liquid L2 dispersed in the first liquid L1 is raised in the first liquid L1. Moreover, the second liquid L2 circulates in the orifice 80 and flows from the main liquid chamber side opening 86 into the main liquid chamber 7A. In addition, finally, the second liquid L2 is collected and accumulated inside a liquid collecting concave portion 50 which is arranged in the vicinity of the main liquid chamber side opening 86. Here, the liquid collecting concave portion 50 is arranged in the front side in the circulation direction of the sealed liquid L which flows from within the orifice 80 into the main liquid chamber 7A through the main liquid chamber side opening 86. Thereby, since the second liquid L2 which flows from the main liquid chamber side opening 86 into the main liquid chamber 7A flows inside the liquid collecting concave portion 50 at the flow rate in which the second liquid flows into the main liquid chamber 7A, the second liquid L2 is easily collected inside the liquid collecting concave portion 50.

In addition, as described above, when a large vibration is input, the internal volume of the main liquid chamber 7A is suddenly increased, and the liquid pressure is decreased in the state where the first liquid L1 and the second liquid L2 are separated, since the first liquid L1 is collected in the main liquid chamber 7A, the second liquid L2 is immediately dispersed into the first liquid L1 in the main liquid chamber 7A. Particularly, since the surface tension of the second liquid L2 is smaller than the surface tension of the first liquid L1, the second liquid L2 is easily dispersed in a wide range into the first liquid L1, and becomes finely granular while having a smaller grain diameter in the first liquid L1. Moreover, the second liquid L2 is dispersed as innumerable granules in the first liquid L1 independent of one another. Therefore, cavitation is preferentially generated in the second liquid L2 in the vicinity of the main liquid chamber side opening 86, and decrease in a local liquid pressure in the vicinity of the main liquid chamber side opening 86 is suppressed. Moreover, as a result, cavitation of the first liquid L1 in the vicinity of the main liquid chamber side opening 86 is effectively suppressed.

In addition, since the liquid collecting concave portion 50 is arranged in the front side in the circulation direction of the sealed liquid L which flows from within the orifice 80 into the main liquid chamber 7A through the main liquid chamber side opening 86, the second liquid L2 in the liquid collecting concave portion 50 easily flows from the main liquid chamber side opening 86 into the orifice 80. Moreover, the second liquid L2 is dispersed into the first liquid L1 in the vicinity of the main liquid chamber side opening 86.

According to the vibrationproof device 1 of the present embodiment, when a large vibration is input in the state where the second liquid L2 is dispersed into the first liquid L1, cavitation of the first liquid L1 in the vicinity of the main liquid chamber side opening 86 is suppressed, and shock waves due to the cavitation collapse generated in the second liquid L2 are suppressed. Thereby, the shock waves of the cavitation collapse generated in the entire vibrationproof device 1 can be decreased, and noise can be decreased.

In addition, according to the vibrationproof device 1 of the present embodiment, only since a small amount of second liquid L2 is added, no influence is exerted on the vibrationproof performance of the vibrationproof device 1. Therefore, noise can be decreased without decreasing the vibrationproof performance of the vibrationproof device 1. Moreover, according to the vibrationproof device 1 of the present embodiment, since it is not necessary to change the configuration of the partition member 8 or the like, noise can be decreased without complicating and increasing the size of the configuration of the vibrationproof device 1.

Moreover, according to the vibrationproof device 1 of the present embodiment, the specific gravity of the second liquid L2 is lighter than the specific gravity of the first liquid L1. Thereby, if time intervals elapse after an engine is stopped and the second liquid L2 is separated from the first liquid L1, the second liquid L2 is collected in the main liquid chamber 7A of the upper side. Thereby, even the state where the first liquid L1 and the second liquid L2 are separated from each other, the second liquid L2 is immediately dispersed into the first liquid L1 in the main liquid chamber 7A if a large vibration is input, and the above-described noise suppressing effect is developed. Therefore, without limited to the traveling, noise due to a great vibration when starting can be also decreased, and the noise suppressing effect is stably developed.

In addition, according to the vibrationproof device 1 of the present embodiment, the second liquid L2 separated from the first liquid L1 is collected in the liquid collecting concave portion 50 which is arranged in the vicinity of the main liquid chamber side opening 86. Thereby, when a large vibration is input in the state where the second liquid L2 is separated from the first liquid L1, the second liquid L2 collected in the vicinity of the main liquid chamber side opening 86 in the main liquid chamber 7A is dispersed into the first liquid L1 in the main liquid chamber 7A. Moreover, the second liquid L2 flows from the main liquid chamber side opening 86 into the orifice 80 in the main liquid chamber 7A, the second liquid L2 is dispersed into the first liquid L1 in the vicinity of the main liquid chamber side opening 86 in which cavitation is easily generated. Thereby, the above-described noise suppressing effect is effectively developed.

Moreover, the liquid collecting concave portion 50 is arranged in the front side in the circulation direction of the sealed liquid L which flows from within the orifice 80 into the main liquid chamber 7A through the main liquid chamber side opening 86. Thereby, the second liquid L2 is easily collected inside the liquid collecting concave portion 50. As a result, the above-described noise suppressing effect is stably developed. In addition, since the liquid collecting concave portion 50 is arranged in the front side in the circulation direction of the sealed liquid L which flows from within the orifice 80 into the main liquid chamber 7A through the main liquid chamber side opening 86, the second liquid L2 in the liquid collecting concave portion 50 easily flows from the main liquid chamber side opening 86 into the orifice 80. As a result, the second liquid L2 can be dispersed in the periphery of the main liquid chamber side opening 86 in which the cavitation is most easily generated, the cavitation can be effectively suppressed.

Figure 3:
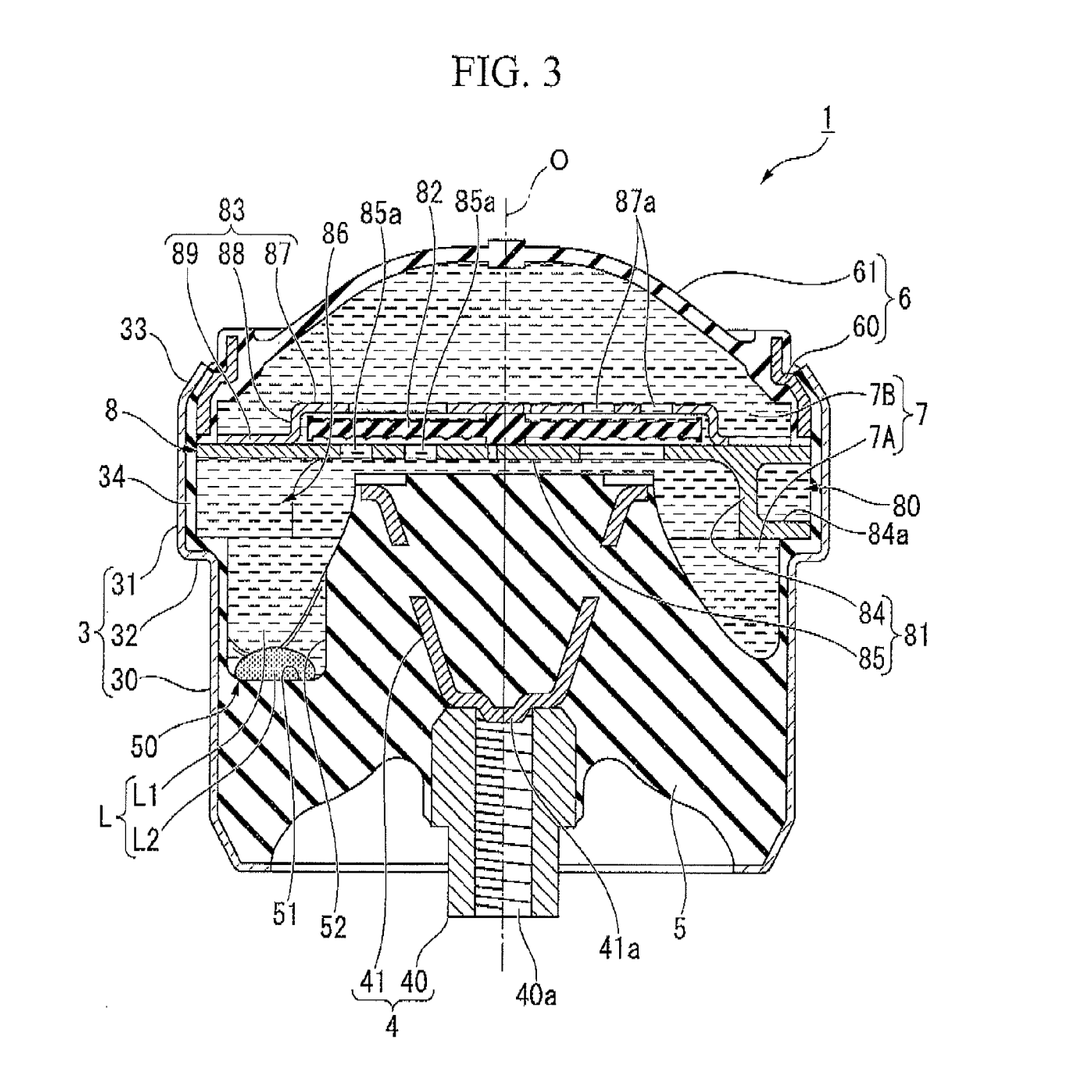
FIG. 3 is a longitudinal cross-sectional view of a vibrationproof device in a second embodiment of the present invention.

The vibrationproof device 101 related to a second embodiment of the present invention is a device for damping a vibration of a vibration generation portion used when an engine which is an example of the vibration generating portion is mounted on a vehicle body which is an example of a vibration receiving portion. As shown in FIG. 3, the vibrationproof device 101 includes an approximately cylindrical outer cylinder 103 which is connected to a vehicle body (not shown) through a vehicle body bracket (not shown); an inner cylinder 104 (corresponding to a second mounting member in the present embodiment) which is connected to an engine (not shown) through an engine bracket (not shown); an elastic body 105 which is elastically connected to the outer cylinder 103 and the inner cylinder 104 and occludes an opening end of the lower side of the outer cylinder 103; a diaphragm 106 which occludes an opening end of the upper side of the outer cylinder 103; and a partition wall 108 which partitions a liquid chamber 107 formed inside the outer cylinder 103 into a main liquid chamber 107A of the lower side having the elastic body 105 as a portion of a wall surface and an auxiliary liquid chamber 107B of the upper side having the diaphragm 106 as a portion of a wall surface. Moreover, the outer cylinder 103, the inner cylinder 104, and the elastic body 105 are integrally formed, a vibrationproof device main body 102 is configured by the outer cylinder 103, the inner cylinder 104, and the elastic body 105. In addition, the vibrationproof device 101 of the present embodiment is a suspension type vibrationproof device in which the main liquid chamber 107A is formed below the auxiliary liquid chamber 107B while interposing the partition member 108, the diaphragm 106 is arranged above the partition member 108, and the inner cylinder 104 is protruded toward the down below of the elastic body 105, and a tension type vibrationproof device in which a tensile force operates the elastic body 105 due to the fact that an initial load is input.

The outer cylinder 103 is an approximately cylindrical metallic member in which each of both ends is opened, and includes a lower tubular portion 130 constituting a lower side portion of the outer cylinder 103, an upper tubular portion 131 which constitutes the upper portion of the outer cylinder 103 and in which the diameter is set to be greater than that of the lower tubular portion 130, and a circular step portion 132 which is interposed over the entire circumference between the lower tubular portion 130 having smaller diameter and the upper tubular portion 131 having greater diameter. Moreover, in the upper end of the outer cylinder 103 (upper tubular portion 131), a caulking portion 133 which is bent to the inside in the radial direction and caulked so as to be fixed to diaphragm 106 (diaphragm ring 160 described below) is formed over the entire circumference. In addition, a covering body 134 which covers the inner circumference surface of the outer cylinder 103 over the entire circumference is vulcanized and adhered to the inner circumference surface of the outer cylinder 103. The covering body 134 is a cover film which is formed of elastic materials such as rubber and is integrally formed to the elastic body 105.

The inner cylinder 104 includes a columnar attaching portion 140 which is extended in the axial direction and an insert portion 141 which is fixed to the upper end of the attaching portion 140 by welding or the like and embedded into the elastic body 105. The attaching portion 140 is a metallic member which is arranged inside the lower end of the outer cylinder 103 and arranged on the axis O. Moreover, the lower end of the attaching portion 140 is further downward protruded than the lower end of the outer cylinder 103. A female screw hole 140a is formed in the attaching portion 140 so as to be screwed on an engine side bracket (not shown). The female screw hole 140a is arranged on the axis O and extended from the upper end surface of the attaching portion 140 to the lower end surface. The upper portion of the attaching portion 140 is embedded inside the elastic body 105. Moreover, the upper end of the female screw hole 140a is occluded by the insert portion 141. In addition, the lower portion of the attaching portion 140 is protruded below the lower surface of the elastic body 105. The insert portion 141 is formed as a taper shape in which the diameter is gradually increased in the upward direction, and is a tubular metal fitting having a bottom portion. Moreover, a convex portion 141a which is fitted into the inside of the female screw hole 140a is formed in the bottom portion of the insert portion 141.

The elastic body 105 is a rubber which occludes an opening portion of the lower side of the outer cylinder 103 and has an approximately truncated cone shape in which the diameter of the upper surface (outer circumferential surface) is gradually decreased in the upward direction. In addition, the outer peripheral portion of the lower end of the elastic body 105 is vulcanized and adhered to the inner circumference surface of the lower end of the outer cylinder 103 (lower tubular portion 130). Moreover, the elastic body 105 is vulcanized and adhered to each of the inner and outer circumferential surfaces of the insert portion 141 embedded to the inside and the inside bottom surface, and is vulcanized and adhered to the outer circumferential surface of the upper portion of the attaching portion 140. In addition, the above-described elastic body 105 and the covering body 134 may use an elastic body which is formed of a synthetic resin or the like other than rubber.

Figure 4:
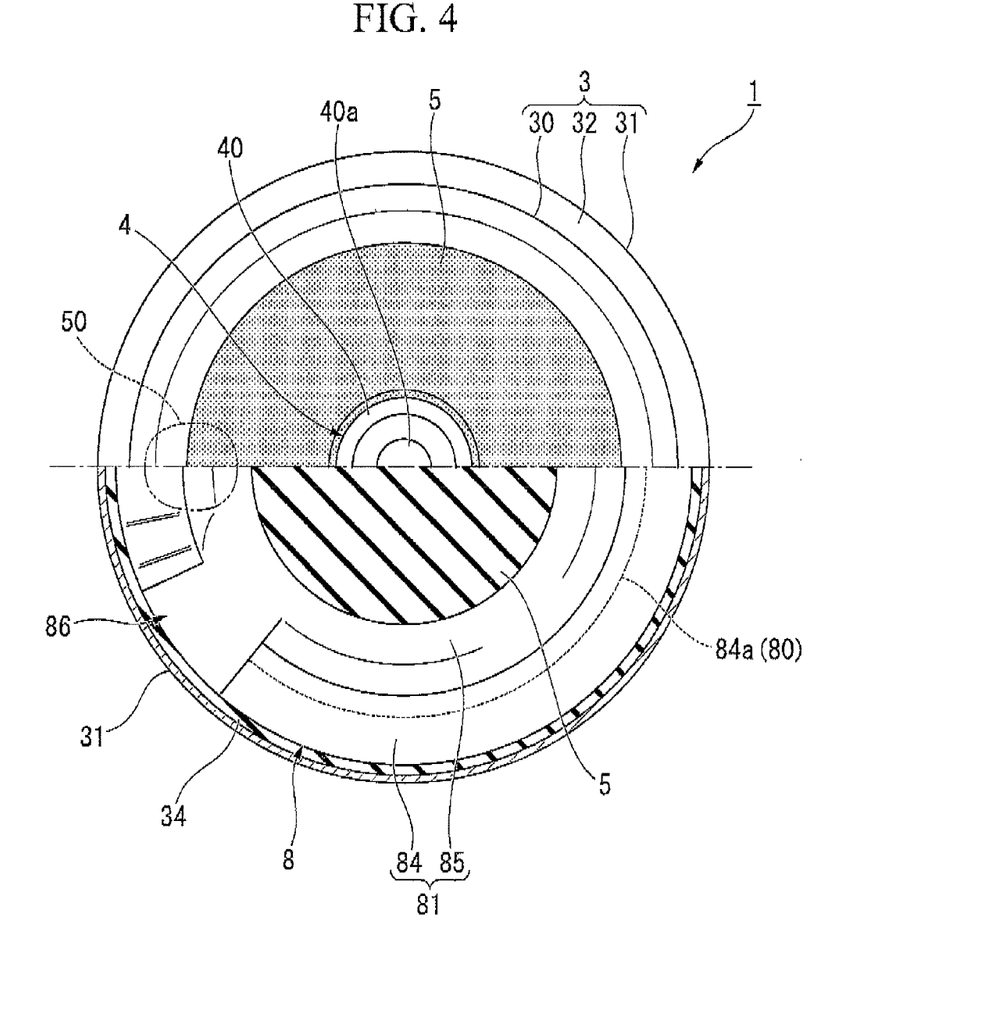
FIG. 4 is a traverse half cross-sectional view of the vibrationproof device in the second embodiment of the present invention.

Moreover, a liquid collecting concave portion 150 which can accommodate a liquid and communicates with the main liquid chamber 107A is provided in the elastic body 105. The liquid collecting concave portion 150 is a concave portion for collecting a second liquid L2 described hereinafter, and arranged in the vicinity of a main liquid chamber side opening 186 described hereinafter as shown in FIG. 4.

In more detail, the liquid collecting concave portion 150 is positioned at the outer circumferential portion of the elastic body 105, that is, a position which is deviated from the axis O in plan view. Specifically, the liquid collecting concave portion 150 is formed in the lowest portion in the tapered upper surface of the elastic body 105. Moreover, the liquid collecting portion 150 is arranged in the front side in a circulation direction of a sealed liquid L which flows from an orifice 180 described hereinafter into the main liquid chamber 107A through the main liquid chamber side opening 186. That is, the liquid collecting concave portion 150 is disposed so as to be adjacent to one side in the circumferential direction of the main liquid chamber side opening 186 which is formed in the end of one side in the circumferential direction of the orifice 180 in plan view. Moreover, in plan view, the liquid collecting concave portion 150 and the main liquid chamber side opening 186 may not be disposed so as be continued and be disposed in a state of slightly being separated from each other or a state of slightly being overlapped each other. In addition, the liquid collecting concave portion 150 includes a bottom wall 151 which is formed along a surface perpendicular to the axis O, and a peripheral wall portion 152 which is erected from the outer edge of the bottom wall 151 and in which the upper end is connected to the tapered upper surface of the elastic body 105.

The partition member 108 includes a tubular partition member main body 181 having an apex, a movable plate 182 which is arranged above the partition member main body 181, and a storage member 183 which is placed on the upper surface of the partition member main body 181 and stores the movable plate 182 therein.

The partition member main body 181 is fitted inside the upper tubular portion 131 of the outer cylinder 103 and locked to the step portion 132 of the outer cylinder 103. The partition member main body 181 includes an annular peripheral wall portion 184, and a top wall 185 which is arranged inside the upper end of the peripheral wall portion 184. A circumferential groove 184a extended along the circumferential direction in the outer circumferential surface is formed in the peripheral wall portion 184, and the longitudinal cross-section of the circumferential groove is a U shape. The circumferential groove 184a communicates the main liquid chamber 107A and the auxiliary liquid chamber 107B. In addition, the circumferential groove 184a is a groove which forms the orifice 180 (corresponding to a restricting passage of the present embodiment) in which a liquid column resonance is generated by circulating the liquid in the liquid chamber 107. That is the circumferential groove 184a is occluded from the outside in the radial direction by the inner circumference surface (coating body 134) of the outer cylinder 103, and therefore, the orifice 180 is formed. Moreover, the main liquid chamber side opening 186 which communicates with the orifice 180 and the main liquid chamber 107A is formed in the lower surface (lower wall portion of circumferential groove 184a) of the peripheral wall portion 184. In addition, the auxiliary liquid chamber side opening (not shown) which communicates with the orifice 180 and the auxiliary liquid chamber 107B is formed in the upper surface (upper wall portion of circumferential groove 184a) of the peripheral wall portion 184. The main liquid chamber side opening 186 is formed on the end of the one side in the circumferential direction of the orifice 180. Moreover, the auxiliary liquid chamber side opening (not shown) is formed on the end of the other side in the circumferential direction of the orifice 180. The top wall 185 is a wall portion which is formed so as to be perpendicular to the axis O. Moreover, a plurality of through-holes 185a opened inside the receiving member 183 are formed on the top wall 185.

The storage member 183 includes a top wall 187 which is disposed to be opposite above the top wall 185 of the partition member main body 181, a peripheral wall portion 188 which is extended below the outer edge of the top wall 187, and a flange portion 189 which is protruded from the lower end of the peripheral wall portion 188 toward the outside in the radial direction. The top wall 187 is a wall portion which is vertically formed to the axis O. Moreover, a plurality of through-holes 187a opened inside the storage member 183 is formed in the top wall 187. The flange portion 189 is placed on the upper surface of the partition member main body 181 (peripheral wall portion 184), and is interposed between the partition member main body 181 and a diaphragm ring 160, described below, and fixed.

For example, the movable plate 182 is a plate shaped member formed of an elastic material such as rubber or the like and is stored inside the peripheral wall portion 188 of the storage member 183. The movable plate 182 can be displaced in the axial direction between the top wall 187 of the storage member 183 and the top wall 185 of the partition member main body 181. Moreover, the through-holes 187a and 185a formed on the top wall 187 of the storage member 183 and the top wall 187 of the partition member main body 181 are appropriately occluded by the movable plate 182.

The diaphragm 106 is a film body which can be deformed according to the liquid pressure fluctuation of the auxiliary liquid chamber 107B, and formed in a dome shape which is bulged toward the upper side. In more detail, the diaphragm 106 includes an annular diaphragm ring 160 and a membranous diaphragm rubber1 161 which is extended inside the diaphragm ring 160. An outer edge of the diaphragm rubber 161 is vulcanized and adhered to inner circumference surface of the diaphragm ring 160 over the entire circumference. The diaphragm ring 160 and the upper end of the outer cylinder 103 are bent to the inside in the radial direction over the entire circumference, and therefore, the diaphragm 106 is caulked so as to be fixed.

The sealed liquid L in which a first liquid L1 is contained as a main liquid and a second liquid L2 is contained as an added liquid is filled in the liquid chamber 107 which is enclosed by the outer cylinder 103, the elastic body 105, and the diaphragm 106 which are described above. Moreover, the first liquid L1 and the second liquid L2 have incompatibility, that is are liquids which are insoluble to each other. In more detail, amount of the second liquid L2 which is an added liquid is less than the amount of the first liquid L1 which is a main liquid, and the weight ratio of the second liquid L2 included in the sealed liquid L is smaller than the weight ratio of the first liquid L1. In addition, in the same temperature (temperature range which is at least −30° C. or more and 100° C. or less), the vapor pressure of the second liquid L2 is higher than that of the main component of the first liquid L1, for example, the vapor pressure of the second liquid L2 is two or more times the vapor pressure of the main component of the first liquid L1. Moreover, a specific gravity of the second liquid L2 is heavier than a specific gravity of the first liquid L1, and the second liquid L2 in the first liquid L1 is lowered (sink). Moreover, the surface tension of the second liquid L2 is smaller than that of the first liquid L1.

As the above-described first liquid L1, for example, substances containing ethylene glycol and propylene glycol, ethylene glycol simple substance, or propylene glycol simple substance, and the like are exemplified. Moreover, as the second liquid L2, for example, fluorinated oil and the like are exemplified. In addition, the sealed liquid L contains the first liquid L1 of 60 weight % or more and 99.9 weight % or less and the second liquid L2 of 0.1 weight % or more and 40 weight % or less. Preferably, the sealed liquid L contains the first liquid L1 of 80 weight % or more and 99 weight % or less and the second liquid L2 of 0.5 weight % or more and 20 weight % or less. For example, when the first liquid L1 is 100 g in the sealed liquid L, the second liquid L2 of 0.5 g to 20 g is contained.

Next, operation of the vibrationproof device 101 related to the second embodiment of the present invention will be explained.

For example, when the inner cylinder 104 and the outer cylinder 103 are greatly relatively displaced in the axial direction due to roughness of a road surface during driving or the like, if a great vibration is input to the vibrationproof device 101, the first liquid L1 or the second liquid L2 pass through the orifice 180, the internal volume of the main liquid chamber 107A is changed, or cavitation is generated in the main liquid chamber 107A. As a result, the second liquid L2 as innumerable granules is dispersed in an independent state to one another in the first liquid L1. In addition, when the internal volume of the main liquid chamber 107A is suddenly increased and the liquid pressure of the main liquid chamber 107A is decreased, cavitation is preferentially generated in the second liquid L2 having higher vapor pressure than the main component of the first liquid L1 in the vicinity of the main liquid chamber side opening 186 of the orifice 180 in which a flow rate is particularly increased in the main liquid chamber 107A. Thereby, a local liquid pressure decrease is suppressed in the vicinity of the main liquid chamber side opening 186, and a phenomenon in which cavitation is generated in the first liquid L1 in the vicinity of the main liquid chamber side opening 186 is suppressed, and even when cavitation is generated in the first liquid L1, bubbles generated due to the cavitation are suppressed so as to be smaller. Thereby, shock waves due to the cavitation collapse in the first liquid L1 are suppressed so as to be smaller.

Moreover, the second liquid L2 becomes granular having a small grain diameter and is dispersed in the first liquid L1. Thereby, a phenomenon in which bubbles generated in the second liquid L2 is largely grown is suppressed. Therefore, a phenomenon in which a shrinkage rate of the bubbles during condensation is increased is suppressed, and shock waves due to the cavitation collapse in the second liquid L2 are suppressed so as to be smaller. Moreover, since innumerable shock waves generated from individual second liquid L2 interfere with one another and the energies are cancelled out. Thereby, the shock waves due to the cavitation collapse in the second liquid L2 are suppressed so as to be smaller.

On the other hand, if time intervals elapse after an engine is stopped, since the specific gravity of the second liquid L2 is heavier than that of the first liquid L1, the second liquid L2 dispersed in the first liquid L1 is lowered in the first liquid L1. Moreover, the second liquid L2 circulates in the orifice 180, and flows from the main liquid chamber side opening 186 into the main liquid chamber 107A. In addition, finally, the second liquid L2 is collected and accumulated inside a liquid collecting concave portion 150 which is arranged in the vicinity of the main liquid chamber side opening 186. Here, the liquid collecting concave portion 150 is arranged in the front side in the circulation direction of the sealed liquid L which flows from within the orifice 180 into the main liquid chamber 107A through the main liquid chamber side opening 186. Thereby, since the second liquid L2 which flows from the main liquid chamber side opening 186 into the main liquid chamber 107A flows inside the liquid collecting concave portion 150 at the flow rate in which the second liquid flows into the main liquid chamber 107A, the second liquid L2 is easily collected inside the liquid collecting concave portion 150.

In addition, as described above, when a large vibration is input, the internal volume of the main liquid chamber 107A is suddenly increased, and the liquid pressure is decreased in the state where the first liquid L1 and the second liquid L2 are separated, since the first liquid L1 is collected in the main liquid chamber 107A, the second liquid L2 is immediately dispersed into the first liquid L1 in the main liquid chamber 107A. Particularly, since the surface tension of the second liquid L2 is smaller than the surface tension of the first liquid L1, the second liquid is easily and in a wide range dispersed into the first liquid L1, and becomes finely granular while having a smaller grain diameter in the first liquid L1. Moreover, the second liquid L2 is dispersed as innumerable granules in the first liquid independent of one another. Therefore, cavitation is preferentially generated in the second liquid L2 in the vicinity of the main liquid chamber side opening 186, and decrease in a local liquid pressure in the vicinity of the main liquid chamber side opening 186 is suppressed. Moreover, as a result, cavitation of the first liquid L1 in the vicinity of the main liquid chamber side opening 186 is effectively suppressed.

In addition, since the liquid collecting concave portion 150 is arranged in the front side in the circulation direction of the sealed liquid L which flows from within the orifice 180 into the main liquid chamber 107A through the main liquid chamber side opening 186, the second liquid L2 in the liquid collecting concave portion 150 easily flows from the main liquid chamber side opening 186 into the orifice 180. Moreover, the second liquid L2 is dispersed into the first liquid L1 in the vicinity of the main liquid chamber side opening 186.

According to the vibrationproof device 101 of the present embodiment, when a large vibration is input in the state where the second liquid L2 is dispersed into the first liquid L1, cavitation of the first liquid L1 in the vicinity of the main liquid chamber side opening 186 is suppressed, the shock waves due to the cavitation collapse generated in the second liquid L2 are suppressed. Thereby, the shock waves from the cavitation collapse generated in the entire vibrationproof device 101 can be decreased, and noise can be decreased.

In addition, according to the vibrationproof device 101 of the present embodiment, only since a small amount of second liquid L2 is added, no influence is exerted on the vibrationproof performance of the vibrationproof device 101. Therefore, noise can be decreased without decreasing the vibrationproof performance of the vibrationproof device 101. Moreover, according to the vibrationproof device 101 of the present embodiment, since it is not necessary to change the configuration of the partition member 108 or the like, noise can be decreased without complicating and increasing the size of the configuration of the vibrationproof device 101.

Moreover, according to the vibrationproof device 101 of the present embodiment, the specific gravity of the second liquid L2 is heavier than the specific gravity of the first liquid L1. Thereby, if time intervals elapse after an engine is stopped and the second liquid L2 is separated from the first liquid L1, the second liquid L2 is collected in the main liquid chamber 107A of the lower side. Thereby, even the state where the first liquid L1 and the second liquid L2 are separated from each other, the second liquid L2 is immediately dispersed into the first liquid L1 in the main liquid chamber 107A if a large vibration is input, and the above-described noise suppressing effect is developed. Therefore, without being limited to the traveling, noise due to a great vibration when starting can be also decreased, and the noise suppressing effect is stably developed.

In addition, according to the vibrationproof device 101 of the present embodiment, the second liquid L2 separated from the first liquid L1 is collected in the liquid collecting concave portion 150 which is arranged in the vicinity of the main liquid chamber side opening 186. Thereby, when a large vibration is input in the state where the second liquid L2 is separated from the first liquid L1, the second liquid L2 collected in the vicinity of the main liquid chamber side opening 186 in the main liquid chamber 107A is dispersed into the first liquid L1 in the main liquid chamber 107A. Moreover, the second liquid L2 flows from the main liquid chamber side opening 186 into the orifice 180 in the main liquid chamber 107A, the second liquid L2 is dispersed into the first liquid L1 in the vicinity of the main liquid chamber side opening 186 in which cavitation is easily generated. Thereby, the above-described noise suppressing effect is effectively exhibited.

Moreover, the liquid collecting concave portion 150 is arranged in the front side in the circulation direction of the sealed liquid L which flows from within the orifice 180 into the main liquid chamber 107A through the main liquid chamber side opening 186. Thereby, the second liquid L2 is easily collected inside the liquid collecting concave portion 150. As a result, the above-described noise suppressing effect is stably developed. In addition, since the liquid collecting concave portion 150 is arranged in the front side in the circulation direction of the sealed liquid L which flows from within the orifice 180 into the main liquid chamber 107A through the main liquid chamber side opening 186, the second liquid L2 in the liquid collecting concave portion 150 easily flows from the main liquid chamber side opening 186 into the orifice 180. As a result, the second liquid L2 can be dispersed in the periphery of the main liquid chamber side opening 186 in which the cavitation is most easily generated, the cavitation can be effectively suppressed.

In addition, the surface tension of the second liquid L2 is smaller than the surface tension of the first liquid L1, and the second liquid is dispersed easily and in a wide range in the first liquid L1. Thereby, cavitation in the first liquid L1 can be effectively suppressed, and noise can be decreased. Moreover, the second liquid L2 having a smaller surface tension than the first liquid L1 is dispersed independently of one another while having a smaller grain diameter in the first liquid L1. Thereby, the shock waves due to the cavitation collapse in the second liquid L2 are reliably suppressed so as to be smaller, and noise is effectively decreased.

As described above, the embodiments of the vibrationproof device related to the present invention will be described. However, the present invention is not limited to the embodiments and can be appropriately changed within the scope which does not depart from the gist.

For example, the first liquid L1 and the second liquid L2 are not limited to the above-described those, and can be appropriately changed as long as the first liquid and the second liquid are a liquid having incompatibility. Moreover, it is also possible to use the second liquid L2 in which the surface tension is the same or higher compared to that of the first liquid L1.

In addition, the liquid contained in the sealed liquid L is not limited two kinds of liquids (first liquid L1 and second liquid L2) and may be the sealed liquid which contains three kinds or more of liquids.

Moreover, in the present invention, the first liquid may be configured of a plurality of components (liquids) having compatibility. In this case, the vapor pressure of the first liquid may be higher than the vapor pressure of the second liquid if the vapor pressure of the second liquid is higher than the vapor pressure of the main component of the first liquid in the same temperature. For example, in the first embodiment of the present invention, when the first liquid consists of a mixed solution of ethylene glycol having a compatibility (vapor pressure of 13.4 Pa at the time of room temperature, content percentage of 96%, and main component) and water (vapor pressure of 3173 Pa at the time of room temperature, content percentage of 4%, and sub-component) and the second liquid consists of silicone oil of 1 cst, the vapor pressure of the first liquid (mixed solution) becomes 400 Pa and is higher than the vapor pressure (167 Pa) of the second liquid. However, since the vapor pressure of the second liquid is higher than the vapor pressure (13.4 Pa) of the main component of the first liquid, the effect which suppresses occurrence of the cavitation can be obtained.

Moreover, in the second embodiment of the present invention, when the first liquid consists of a mixed solution of ethylene glycol having a compatibility (vapor pressure of 13.4 Pa at the time of room temperature, content percentage of 96%, main component) and water (vapor pressure of 3173

Pa at the time of room temperature, content percentage of 4%, sub-component) and the second liquid consists of fluorinated oil, the vapor pressure of the first liquid (mixed solution) becomes 400 Pa and is higher than the vapor pressure of the second liquid. However, since the vapor pressure of the second liquid is higher than the vapor pressure (13.4 Pa) of the main component of the first liquid, the effect which suppresses occurrence of the cavitation can be obtained.

In addition, in the first embodiment of the present invention, when a liquid, in which the vapor pressure is higher than that of water and the specific gravity is lighter than that of water, is used as the second liquid, it is also possible to use simple substance of water as the first liquid.

Moreover, in the second embodiment of the present invention, when a liquid, in which the vapor pressure is higher than that of water and the specific gravity is heavier than that of water, is used as the second liquid, it is also possible to use simple substance of water as the first liquid.

In addition, the vibrationproof device related to the present invention is not limited to the engine mount of vehicle and can be also applied to vibrationproof devices other than the engine mount. For example, the vibrationproof device of the present invention can be also applied to the mount of a generator mounted on construction machinery and to the mounts of machines installed on factories or the like.

In addition, in the above-described embodiment, the diaphragms 6 and 106 (diaphragm rings 60 and 160) are caulked so as to be fixed to the ends of the outer cylinders 3 and 103. However, the present invention is not limited to the configuration in which the diaphragms 6 and 106 are caulked so as to be fixed to the outer cylinders 3 and 103, for example, the diaphragms may be fixed to the outer cylinder (first mounting member) by fasteners or the like.

Moreover, in the above-described embodiment, the orifices 80 and 180 are formed in the partition members 8 and 108. However, in the present invention, the orifices 80 and 180 may be formed at places other than the partition members 8 and 108. For example, the orifice (restricting passage) may be formed by forming a groove in a portion of the outer cylinder (first mounting member), or the orifice (restricting passage) may be formed by forming a groove in a portion of the caulking portion such as the diaphragm ring or the like.

In addition, in the above-described embodiment, the liquid collecting concave portions 50 and 150 are arranged in the front side in the circulation direction of the sealed liquid L from the orifices 80 and 180 to the main liquid chambers 7A and 107A through the main liquid chamber side openings 86 and 186. However, in the present invention, the liquid collecting concave portions 50 and 150 can be arranged in positions different from the above-described position. For example, the liquid collecting concave portions 50 and 150 may be arranged vertically below the main liquid chamber side openings 86 and 186.

Others, components of the above-described embodiments can be appropriately replaced with well-known components and the above-described modifications may be appropriately combined within the scope which does not depart from the gist of the invention.

INDUSTRIAL APPLICABILITY

According to the present invention, occurrence of cavitation can be suppressed without decreasing the vibrationproof performance or complicating and increasing the size of a configuration.

DESCRIPTION OF THE REFERENCED SYMBOLS

1, 101: vibrationproof device
3, 103: outer cylinder (first mounting member)
4, 104: inner cylinder (second mounting member)
5, 105: elastic body
7, 107: liquid chamber
7A, 107A: main liquid chamber
7B, 107B: auxiliary liquid chamber
8, 108: partition member
50, 150: liquid collecting concave portion
80, 180: orifice (restricting passage)
86, 186: main liquid chamber side opening
L: sealed liquid
L1: first liquid
L2: second liquid

The invention claimed is:

1. A vibrationproof device which is a liquid sealed vibrationproof device comprising:
   a tubular first mounting member that is connected to either one of a vibration generating portion and a vibration receiving portion;
   a second mounting member that is connected to other one of the vibration generating portion and the vibration receiving portion;
   an elastic body that elastically connects the first mounting member and the second mounting member to each other; and
   a partition member that partitions a liquid chamber of the inside of the first mounting member into a main liquid chamber of an upper side having the elastic body as a portion of a wall surface and an auxiliary liquid chamber of a lower side,
   wherein a restricting passage is formed which communicates with the main liquid chamber and with the auxiliary liquid chamber and in which a liquid column resonance is generated due to the fact that a liquid in the liquid chamber is circulated,
   a sealed liquid is sealed in the liquid chamber, the sealed liquid contains a first liquid as a main liquid and a second liquid as an added liquid which is insoluble in the first liquid,
   a vapor pressure of the second liquid is higher than a vapor pressure of a main component of the first liquid in the same temperature and a specific gravity of the second liquid is lighter than a specific gravity of the first liquid and
   the second liquid is dispersed into a plurality of places in the first liquid, when receiving a vibration.

2. The vibrationproof device according to claim 1,
   wherein a liquid collecting concave portion which is arranged in a vicinity of a main liquid chamber side opening of the restricting passage and in which the second liquid is collected is formed in the elastic body.

3. The vibrationproof device according to claim 2,
   wherein the liquid collecting concave portion is arranged in a front side in a circulation direction of the sealed liquid from the restricting passage to the main liquid chamber through the main liquid chamber side opening.

4. The vibrationproof device according to claim 1,
   wherein a surface tension of the second liquid is smaller than a surface tension of the first liquid.

5. The vibrationproof device according to claim 1,
   wherein the dispersed second liquid limits increases in size of bubbles formed in the first liquid in response to the vibration by generating bubbles earlier in the second liquid than the first liquid in response to the vibration.

6. The vibrationproof device according to claim 1, wherein the sealed liquid contains the second liquid in a concentration of 0.5 weight % or more and 20 weight % or less.

7. The vibrationproof device according to claim 1, wherein a ratio of weight percentage of the second liquid to the first liquid is 50/99 to 25%.

\* \* \* \* \*